(12) United States Patent
Bigogno et al.

(10) Patent No.: US 10,730,198 B2
(45) Date of Patent: Aug. 4, 2020

(54) PLANT FOR MANUFACTURING TYRES AND MANUFACTURING METHOD RELATED THERETO

(71) Applicant: PIRELLI TYRE S.P.A., Milan (IT)

(72) Inventors: Mauro Bigogno, Milan (IT); Gianni Portinari, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 387 days.

(21) Appl. No.: 15/603,134

(22) Filed: May 23, 2017

(65) Prior Publication Data

US 2017/0320223 A1    Nov. 9, 2017

Related U.S. Application Data

(62) Division of application No. 12/084,293, filed as application No. PCT/IT2005/000659 on Nov. 11, 2005, now abandoned.

(51) Int. Cl.
*B29D 30/30* (2006.01)
*B26D 5/16* (2006.01)
(Continued)

(52) U.S. Cl.
CPC ............... *B26D 5/16* (2013.01); *B26D 1/085* (2013.01); *B29D 30/3028* (2013.01); *B29D 30/46* (2013.01); *B26D 3/003* (2013.01)

(58) Field of Classification Search
CPC ........ B29D 30/00; B29D 30/30; B29D 30/46; B29D 30/3028; B29D 30/3064;
(Continued)

(56) References Cited

U.S. PATENT DOCUMENTS 3,904,471 A   9/1975   Kubinski
3,944,457 A   3/1976   Podvin et al.
(Continued)

FOREIGN PATENT DOCUMENTS

DE    326294 C    9/1920
EP    0264720 A1  4/1988
(Continued)

OTHER PUBLICATIONS

International Preliminary Report on Patentability for International Application No. PCT/IT2005/000659 filed on Nov. 11, 2005 on behalf of Pirelli Tyre S.P.A. dated May 14, 2008. 8 pages.
(Continued)

*Primary Examiner* — Robert C Dye
*Assistant Examiner* — Cedrick S Williams
(74) *Attorney, Agent, or Firm* — Steinfl + Bruno LLP (57) ABSTRACT

Within tyre manufacturing, a reinforcing structure of the tyre, such as the zero-degree layer of the belt structure, is made by an apparatus having devices for guiding a continuous elongated element towards a forming drum, devices for applying the elongated element against a laying surface of the drum, and a cutting unit to cut off the continuous elongated element when application has been completed. Once the cutting operation has been carried out, the free end of the continuous elongated element is set to a grip position downstream of the cutting unit, through a reciprocating slider and a threading element blocking the continuous elongated element with respect to the slider when the latter moves towards the forming drum.

22 Claims, 7 Drawing Sheets

(51) Int. Cl.
    *B26D 1/08*     (2006.01)
    *B29D 30/46*     (2006.01)
    *B26D 3/00*     (2006.01)

(58) Field of Classification Search
    CPC . B29D 3/00; B29D 3/005; B29D 9/18; B29D 9/2204; B29D 9/22; B29D 2009/2219
    See application file for complete search history.

(56) References Cited

U.S. PATENT DOCUMENTS

| | | | |
|---|---|---|---|
| 4,617,074 A * | 10/1986 | Portalupi | B29D 30/3007 156/130 |
| 4,877,477 A * | 10/1989 | Yabe | B29D 30/3028 156/406.4 |
| 4,975,134 A | 12/1990 | Mogi et al. | |
| 4,983,243 A | 1/1991 | Nakano et al. | |
| 5,335,415 A * | 8/1994 | Okufuji | B29D 30/1628 156/117 |
| 2009/0250156 A1 | 10/2009 | Bigogno et al. | |

FOREIGN PATENT DOCUMENTS

| | | |
|---|---|---|
| EP | 0288987 A2 | 11/1988 |
| EP | 0561609 A1 | 9/1993 |
| GB | 1487426 A | 9/1977 |
| SK | 283557 B6 | 9/2003 |
| WO | 2007/054984 A1 | 5/2007 |

OTHER PUBLICATIONS

International Search Report for International Application No. PCT/IT2005/000659 filed on Nov. 11, 2005 on behalf of Pirelli Tyre S.P.A. dated Aug. 2, 2006. 3 pages.
Restriction Requirement for U.S. Appl. No. 15/603,134, filed May 23, 2017 on behalf of Pirelli Tyre S.P.A.dated Jul. 12, 2019. 8 pages.
Written Opinion for International Application No. PCT/IT2005/000659 filed on Nov. 11, 2005 on behalf of Pirelli Pneumatici S.P.A. dated Aug. 2, 2006. 7 pages.
EP Communication for EP Application No. 05 823 483.2-2307 filed on behalf of Pirelli Tyre S.P.A. Notification date: Jul. 2, 2010. 4 pages.
Notification of the First Office Action for Chinese Application No. 200580052037.8 filed on behalf of Pirelli Tyre S.P.A. Notification date: Jan. 15, 2010. 13 pages. (Chinese + English Translation).

\* cited by examiner

PLANT FOR MANUFACTURING TYRES AND MANUFACTURING METHOD RELATED THERETO

CROSS REFERENCE TO RELATED APPLICATIONS

The present application is a divisional application of U.S. application Ser. No. 12/084,293 having a filing or 371(c) date of May 7, 2009 which is the U.S. national stage of International Application PCT/IT2005/000659 filed on Nov. 11, 2005, all of which are herein incorporated by reference in their entirety.

The present invention relates to a plant for manufacturing tyres and to a manufacturing method that may be put into practice by said plant.

In manufacturing tyres for vehicle wheels it is usually provided that a carcass structure be formed on a building drum, said carcass structure being first in the form of a cylindrical sleeve essentially comprising one or more carcass plies, a possible inner coating layer of elastomer material usually identified as "liner", and a pair of annular reinforcing structures to be engaged close to the axially opposite end flaps of the carcass ply, so that in the finished tyre said reinforcing structures are incorporated into the so-called beads, in the vicinity of the radially internal edges of the tyre itself.

A so-called belt structure is formed on a separated forming drum and it essentially comprises one or more belt layers each made up of textile or metallic cords disposed in a suitably inclined orientation relative to a circumferential direction and normally crossed with respect to the cords of the possibly present adjacent belt layer. Manufacture of the belt structure also contemplates formation of at least one reinforcing structure consisting of at least one continuous elongated element formed of one or more parallel longitudinal cords possibly incorporated in an elastomer matrix. This continuous elongated element is wound up into circumferential coils disposed in axial side by side relationship to form a so-called "zero-degree layer", in which the reinforcing cords have an orientation substantially coincident with a circumferential direction. Depending on requirements, one or more zero-degree layers can be provided, each of them extending along the whole width of the belt structure or a portion of the axial extension thereof, normally overlapping one of the edges of the underlying belt layers consisting of crossed cords.

The belt structure is subsequently coupled with the carcass sleeve which is given a substantially toroidal conformation following insufflation of air into the carcass plies and simultaneous approaching of the axially opposite edges thereof integrating the annular reinforcing structures.

Before or after coupling between the carcass structure and the belt structure, a tread band is applied to the belt structure at a radially external position, and a pair of sidewalls are applied to the carcass structure at laterally opposite positions, if said sidewalls have not been laid down beforehand during a preliminary manufacturing step of the carcass structure itself.

It is known that in plants for tyre manufacture use of apparatus is provided that are able to form reinforcing inserts integrated into the belt structure in an automated manner.

For example, document U.S. Pat. No. 3,904,471 proposes an apparatus for application of a reinforcing insert in the form of a strip to the carcass structure supported on a building drum. The reinforcing strip-like insert is guided on an application wheel rotating in contact relationship with the carcass structure. Following rotation, the application wheel circumferentially applies the strip to the carcass structure.

When laying of the strip onto the carcass structure has occurred for about three fourths of the circumferential extension of said carcass structure, a plate-like element located tangential to the application wheel carries out a radial translation away from the latter, to bring the strip against a fixed heated blade cutting the strip in parallel to the extension of the cords, to a size coincident with the circumferential extension of the carcass.

Said apparatus is adapted to operate on reinforcing strip-like inserts containing transversely-oriented cords of a suitable inclination relative to the longitudinal extension of the strip itself. On the other hand, this apparatus is not adapted to process reinforcing structures in which the cords extend parallel to the longitudinal extension of the strip, because the heated blade alone is not able to cut the cords off above all if they are made of metal material or in any case a material of high toughness.

Document U.S. Pat. No. 4,983,243 proposes use of an apparatus adapted to automatically make the zero-degree layers disposed at a radially external position on the belt structure of a tyre being processed. In this apparatus, in front of the forming drum, provision is made for a feeding guide to supply the strip-like material incorporating textile cords parallel to the longitudinal extension, a grip unit to retain the opposite edges of the continuous strip, at least one first pusher disposed close to the grip unit to press the front end of the strip against the forming drum, a unit to cut the strip off, operating downstream of the first pusher, and at least one second pusher operating downstream of the cutting unit to compress the rear end of the strip against the forming drum. In a starting step of the operating cycle, the first pusher picks up the front end of the strip from the grip unit to apply it against the surface of the drum. The drum is then set in rotation, so as to wind the strip circumferentially around the belt structure carried by the drum itself. An axial movement of the guide structure can be carried out to cause winding of the strip into coils disposed in axial side by side relationship. At the end of the winding operation, a backward movement of the feeding guide from the drum gives rise to engagement of the strip in the grip unit, concurrently with stopping of rotation of the drum. The cutting unit made up of a fixed blade and a movable blade that are scissors-like hinged is brought to act on the strip length extending between the grip unit and the drums, to cut the strip itself. When the cutting operation has been completed, the cutting unit is put to a rest position, and the second pusher is moved close to the drum to secure the free end of the cut trip thereon.

The Applicant has however perceived that also the apparatus proposed by U.S. Pat. No. 4,983,243 is not adapted to operate in a quick and accurate manner on continuous elongated elements reinforced with cords made of steel or other very tough material. Use of scissors-like hinged blades as proposed by U.S. Pat. No. 4,983,243 in fact does not allow high shearing stresses to be applied and in addition it can transmit transverse-force components to the continuous elongated element that are unfavourable to a correct execution of the cut. This problem becomes particularly important if the cords are of a relatively large diameter which often happens in manufacturing tyres for lorries, for example.

The Applicant, on the contrary, has become aware of the fact that for cutting off a continuous elongated element reinforced with steel cords in a quick and satisfactorily precise manner it is necessary to use a cutting unit in which the cutting edges act with a limited stroke so as to transmit high shearing stresses also through use of small-sized actuators.

On the other hand, this requirement can be hardly reconciled with the necessity to carry out translation of the cutting unit transversely of the continuous elongated element, as proposed by U.S. Pat. No. 4,983,243.

In accordance with the Applicant's perceptions, to bring the end of the elongated element back to a position suitable for application onto the forming drum after cutting, it is necessary to carry out a longitudinal translation of the elongated element through the cutting unit.

Therefore, it has been found that in order to handle a continuous elongated element in a satisfactorily quick and accurate manner also through a cutting unit suitable for the above described purposes, a feeding system is required that is able to longitudinally translate the elongated element itself without causing side deflections of same, which could give rise to interferences and frictions with the cutting unit and/or other adjacent mechanical elements.

This is particularly useful when high-elongation steel cords are used as elongated elements, i.e. cords consisting of a plurality of wires or strands (i.e. a combination of several wires twisted together) loosely associated with each other so as to allow the cord to elongate when submitted to a low tensile load. These types of cords are not very handy during the feeding, application and cutting steps because when an applied load even of small amount is removed (for example, when the cord is moved forwards step by step by a pulling or pushing action, or when it is cut), the cord greatly shrinks and often in an uncontrolled manner, so that an automated control of the process becomes difficult.

In a first aspect, the present invention relates to plant for manufacturing tyres, comprising: devices to make a carcass structure; devices to make a belt structure; devices to apply the belt structure to the carcass structure at a radially external position thereof; devices to apply sidewalls to the carcass structure at laterally opposite positions; devices to apply a tread band to the belt structure at a radially external position;

wherein the devices to make the belt structure comprise at least one apparatus for forming a reinforcing structure, said apparatus comprising: a forming drum drivable in rotation; devices to guide a continuous elongated element comprising et least one reinforcing cord towards the forming drum; devices for application of the continuous elongated element against a laying surface externally carried by the forming drum; at least one unit for cutting the continuous elongated element on a length thereof included between the guide devices and the application devices; feeding devices operating on the continuous elongated element to set one free end of the continuous elongated element to a grip position downstream of the cutting unit;

wherein the feeding devices comprise a slider alternately movable in a longitudinal feed direction of the continuous elongated element, and at least one threading element carried by the slider and operating on the continuous elongated element to block it relative to the slider when the slider moves towards the forming drum.

Thus, when cutting has been completed, it is possible to cause translation of the continuous elongated element through the cutting unit without grip elements being required to operate through the passage clearance defined between the cutting edges of the cutting unit itself.

Preferably, the cutting edges of the cutting unit before reaching the cutting position define a passage clearance at least partly enclosing the continuous elongated element to be cut off. This enables-execution of a very precise cut, in the absence of force components inducing side displacements on the elongated element itself.

In a further aspect, the present invention relates to a method of manufacturing tyres, comprising the steps of: making a carcass structure, making a belt structure; applying the belt structure to the carcass structure at a radially external position thereof; applying sidewalls to the carcass structure at laterally opposite positions; applying a tread band to the belt structure at a radially external position; wherein the step of making the belt structure comprises: forming at least one reinforcing structure through winding on the forming drum of at least one continuous elongated element comprising at least one reinforcing cord, to form circumferential coils disposed consecutively in side by side relationship; wherein the step of forming at least one reinforcing structure on the forming drum comprises: guiding the continuous elongated element towards the forming drum drivable in rotation; applying the continuous elongated element against a laying surface externally carried by the forming drum; cutting off the continuous elongated element upon the action of a cutting unit; setting one free end of the continuous elongated element to a grip position downstream of the cutting unit; wherein the step of setting one free end of the continuous elongated element to a grip position comprises the steps of: driving a slider movable with a reciprocating motion, in a longitudinal feed direction of the continuous elongated element, and blocking the continuous elongated element relative to the slider when the slider moves towards the forming drum.

Further features and advantages will become more apparent from the detailed description of a preferred, but not exclusive, embodiment of a plant for manufacturing tyres and the manufacturing method related thereto, in accordance with the present invention. This description will be set out hereinafter with reference to the accompanying drawings, given by way of non-limiting example, in which.

Figure 1:
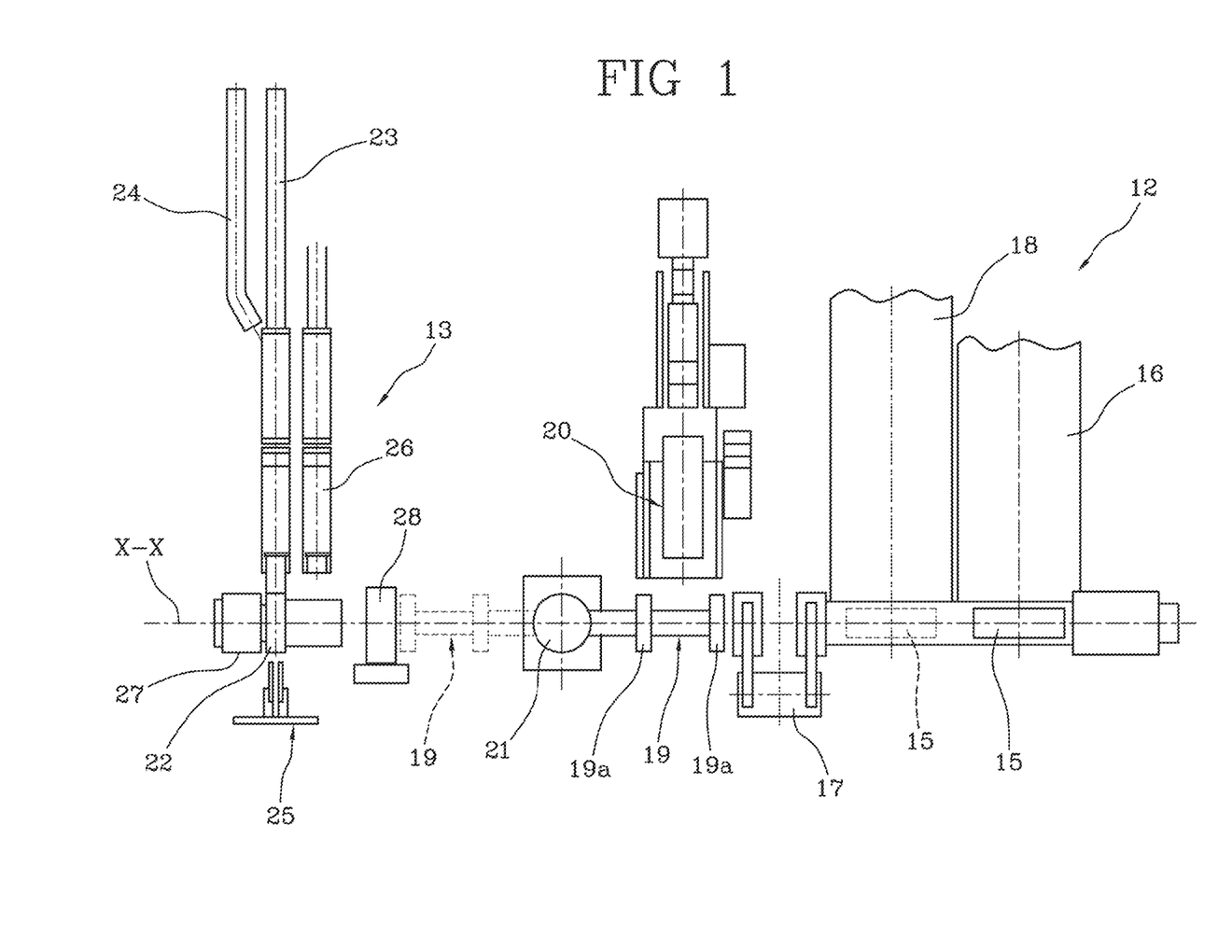
FIG. 1 diagrammatically shows a plant for manufacturing tyres in accordance with the present invention.

With reference to the drawings, and in particular to FIG. 1, a plant for manufacturing tyres in accordance with the present invention has been generally identified by reference numeral 1.

Figure 6:
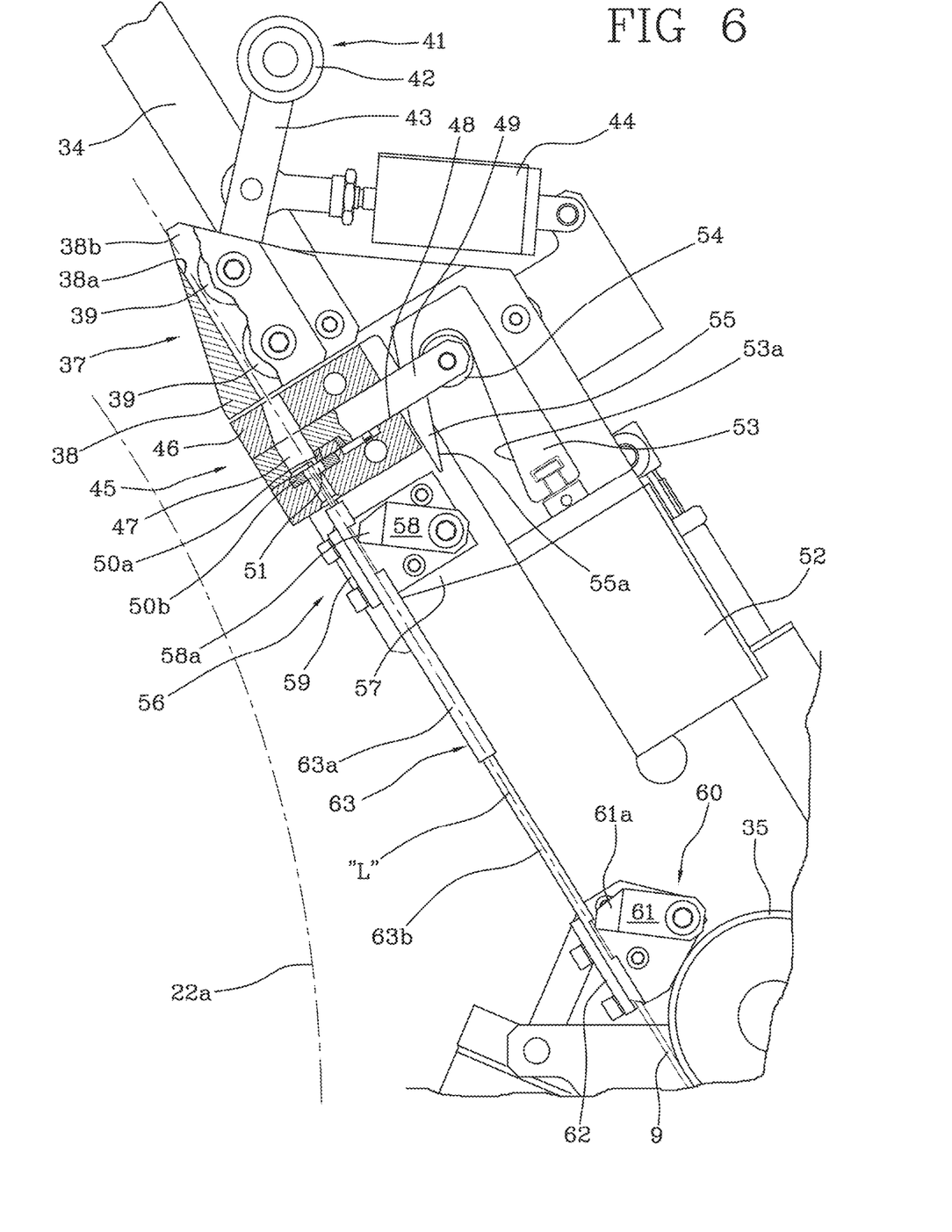
FIG. 6 shows a step of moving the continuous elongated element to a grip position.
Figure 8:
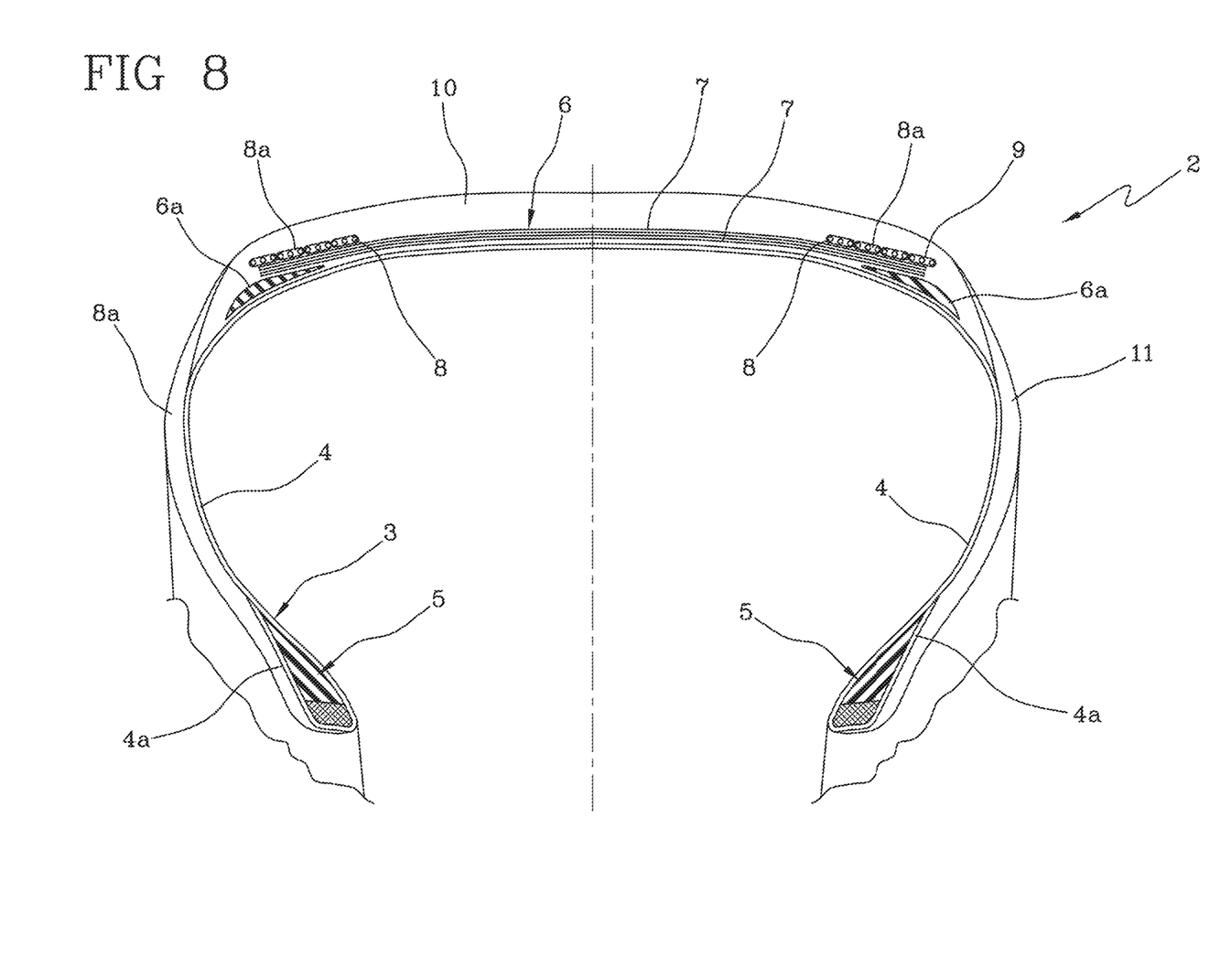
FIG. 8 is a cross-section view of a tyre obtainable in accordance with the present invention.

Plant 1 is set to manufacture a tyre 2 for vehicle wheels that, as diagrammatically shown in FIG. 6, essentially comprises a carcass structure 3 having one or more carcass plies 4 with axially opposite respective end flaps 4a in engagement with respective annular anchoring structures 5 defining the so-called tyre "beads" at the circumferential inner edges of the tyre 2 itself. The carcass plies 4 can be internally coated with a so-called "liner" 3a essentially formed of an elastomer layer that is impervious to air or other fluid suitable for inflation of tyre 2. Applied at a radially external position to the carcass structure 3 is a belt structure 6 comprising one or more "belt layers" 7 reinforced with textile or metallic cords disposed in a suitably inclined orientation relative to the circumferential extension of tyre 2 and normally crossed with respect to the orientation of the cords belonging to the adjacent layer or layers. The belt structure 6 further comprises at least one reinforcing structure 8, of the type usually referred to as "zero-degree layer", applied thereto at a radially external position with respect to said belt layers 7. The zero-degree layer 8 is usually made up of at least one continuous elongated element 9 wound up into coils disposed side by side in an axial direction, in a mutually approached relationship or suitably spaced apart from each other, according to the axial extension of tyre 2. This continuous elongated element 9 may consist of one or more longitudinal, textile or metallic, reinforcing cords substantially parallel to each other and incorporated in a raw elastomer material so as to form a strip-like element.

Preferably, the zero-degree layer 8 is formed with at least one high-elongation steel cord, i.e. a cord consisting of a plurality of wires or strands (i.e. a combination of several wires twisted together) loosely associated with each other so as to allow the cord to elongate when submitted to a low tensile load.

High-elongation steel cords suitable for making the zero-degree layer B generally have a percent elongation of at least 0.4%, preferably from 0.5 to 4%, with an applied load not exceeding 5% of the ultimate tensile stress of the cord itself. Typical examples of high-elongation cords are the cords of the "High Elongation" (HE) type or also the so-called "Open Cords" (OC): see for example either the "Steelcord Catalogue" issued by N. V. Bekaert S. A. (Edition August 1991, pages 17-25), or Patents GB 1,467,426 and EP 0 288 967 A2.

In the shown embodiment the zero-degree layer 8 is made up of two distinct portions 8a each extending towards the equatorial plane of tyre 2 starting from one of the axially opposite edges of the underlying belt layers 7.

A tread band 10 circumferentially extends in a radially superposed relationship with the belt structure 6 and a pair of sidewalls 11 each extend between an axially external edge of the tread band 10 and one of the beads, to cover the respective side portion of the carcass structure 3.

Plant 1 essentially comprises a first manufacturing station 12 equipped with devices for making the carcass structure 3, a second manufacturing station 13 equipped with devices for making the belt structure 6 and devices for application of the belt structure 6 to the carcass structure 3 at a radially external position.

In more detail, the first manufacturing station 12 may for example comprise a so-called building drum 15 interlocked with at least one first feeding line 16 through which feeding of the following components in the form of a strip to be wound on the building drum 15 occurs: liner 3a, sidewalls 11 and/or other possible components provided in the manufacture of tyre 2.

A second feeding line 18 can be provided to feed the carcass ply or plies. Winding of liner 3a, the carcass plies 4 and possibly the sidewalls 11 gives rise, on the building drum 15, to a so-called carcass sleeve of a substantially cylindrical conformation.

A first transfer member 17 axially movable relative to the building drum 15 receives the annular anchoring structures 5 and fits them in coaxial relationship on the building drum 15. Following a radial expansion of the building drum 15, engagement of the carcass sleeve with the annular anchoring structure 5 carried by the first transfer member 17 occurs.

Subsequently, the first transfer member 17 picks up the carcass sleeve from the building drum 15 and transfers it to a so-called shaping drum 19 comprising two shell halves 19a adapted to be suitably moved close to each other in an axial direction. A third feeding line 20 can operate close to the shaping drum 19 and through this line 20 feeding of the so-called under-belt inserts to be circumferentially applied around the carcass ply can possibly take place.

The shaping drum 19 can be mounted on a rotatable turret 21 allowing movement of same between a first operating position at which, as shown in solid line in FIG. 1, it interacts with the first manufacturing station 12 to receive the carcass sleeve and under-belt inserts, if any, and a second operating position at which, as shown in chain line, it interacts with the devices for application of the belt structure 6 to the carcass structure 3.

The second manufacturing station 13 is equipped with devices for making the belt structure 6, essentially comprising a forming drum 22 drivable in rotation around a geometric axis X-X thereof. Interlocked with the forming drum 22 is at least one fourth feeding line 23 and a possible fifth feeding line 24 supplying the belt layers 7 to be circumferentially wound, sequentially in mutually superposed relationship, around a laying surface 22a exhibited by the forming drum 22 and/or possible materials previously laid on the drum itself.

Also provided is an apparatus 25 adapted to make the zero-degree layer 8 or similar reinforcing structure on the forming drum 22 optionally carrying the previously made belt layers 7. In the second manufacturing station devices for making the tread band 10 may be in addition arranged, which devices consist of a sixth feeding line 26 for example, providing the tread band 10 in the form of a strip cut to size for application around the belt structure 6 previously made on the forming drum 22.

The forming drum 22 can be mounted on a bearing structure 27 movable in parallel to the rotation axis X-X of the drum itself, to sequentially position the latter in front of the belt layer 7 feeding lines 23, 24, the apparatus 25 for making the reinforcing structure 8 and/or the feeding line 26 for the tread band 10. Alternatively, the bearing structure 27 can be fixed and the belt-layer 7 feeding lines 23, 24 can be selectively translated to a position in alignment with the forming drum 22.

The devices for application of the belt structure 6 to the carcass structure 3 preferably comprise an annular transfer member 28 adapted to pick up the belt structure 6 with the tread band 10 possibly formed thereon from the forming drum 22 and lay it down in coaxial relationship around the shaping drum 19 positioned in the second operating position and carrying the previously formed carcass structure 3. Following axial approaching of the shell halves 19a of the shaping drum 19 and simultaneous admission of air or other inflating fluid to the carcass structure 3, the latter is shaped into a toroidal configuration to be internally applied against the belt structure 6. If required, during this step also turning up of the sidewalls 11 against the side surfaces of the carcass structure 3 can be carried out.

Figures 2, 5:
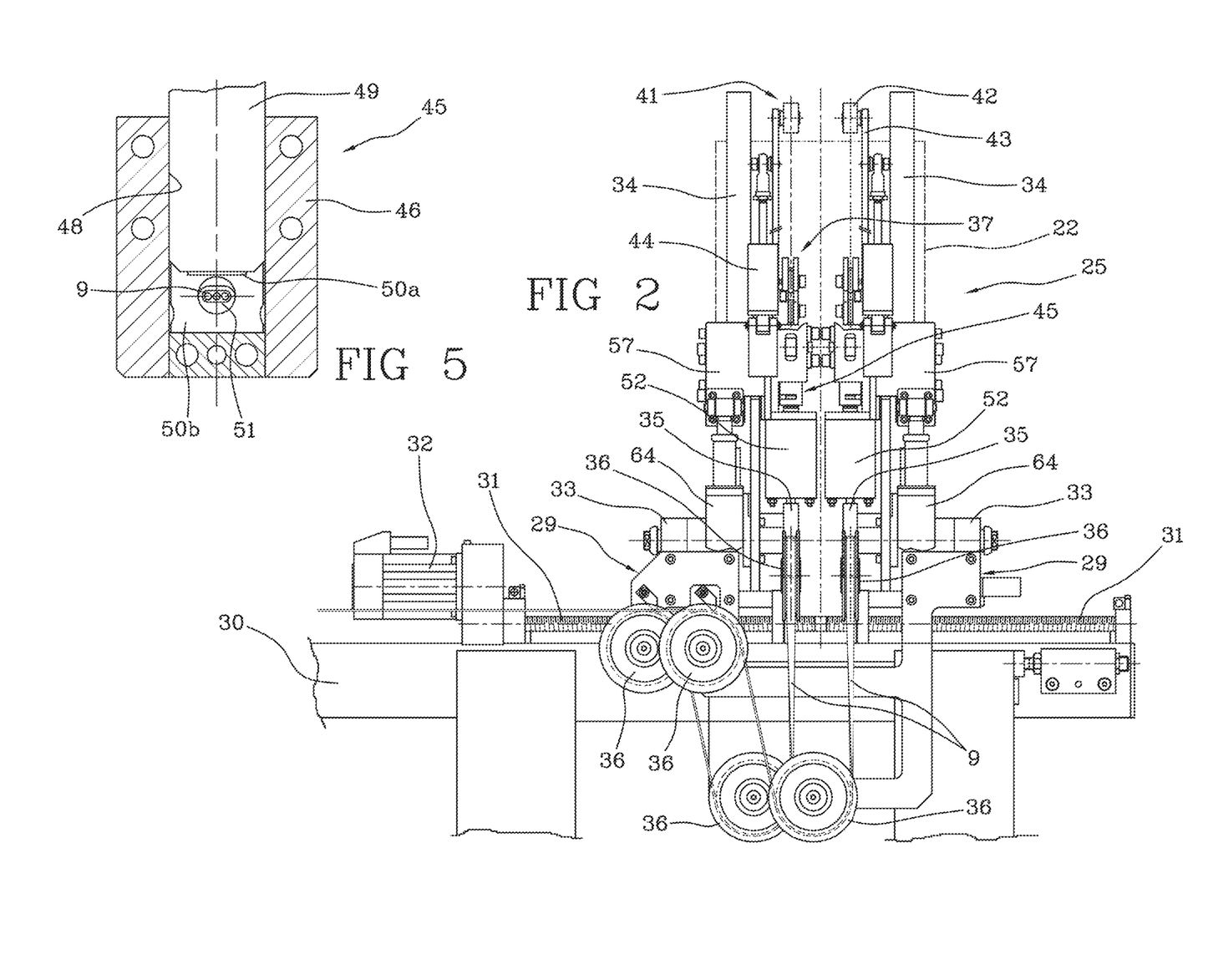
FIG. 2 is an elevation view of an apparatus adapted to form the reinforcing structures associated with the plant in reference.
FIG. 5 shows a detail sectioned along line in FIG. 4.

Apparatus 25 adapted to make the zero-degree layer 8 or other similar reinforcing structure comprises at least one carriage 29 movable on a guide and support structure 30 in parallel to the rotation axis X-X of the forming drum 22. Alternatively, the carriage can be fixed and the movement according to the rotation axis X-X can be obtained by moving the bearing structure 27. In more detail, in a preferential solution, provision is made for two carriages 29 disposed in parallel side by side relationship locations and simultaneously movable close to and away from each other upon command of a screw 31 having two portions threaded in respectively opposite ways, each of said portions being operatively in engagement with a respective nut screw carried by one of the carriages 29. In this way carriages 29 can be moved away from and close to each other following rotation of the screw 31 in either way, since the screw is drivable in rotation by a motor 32 fastened to the guide and support structure 30.

Figure 3:
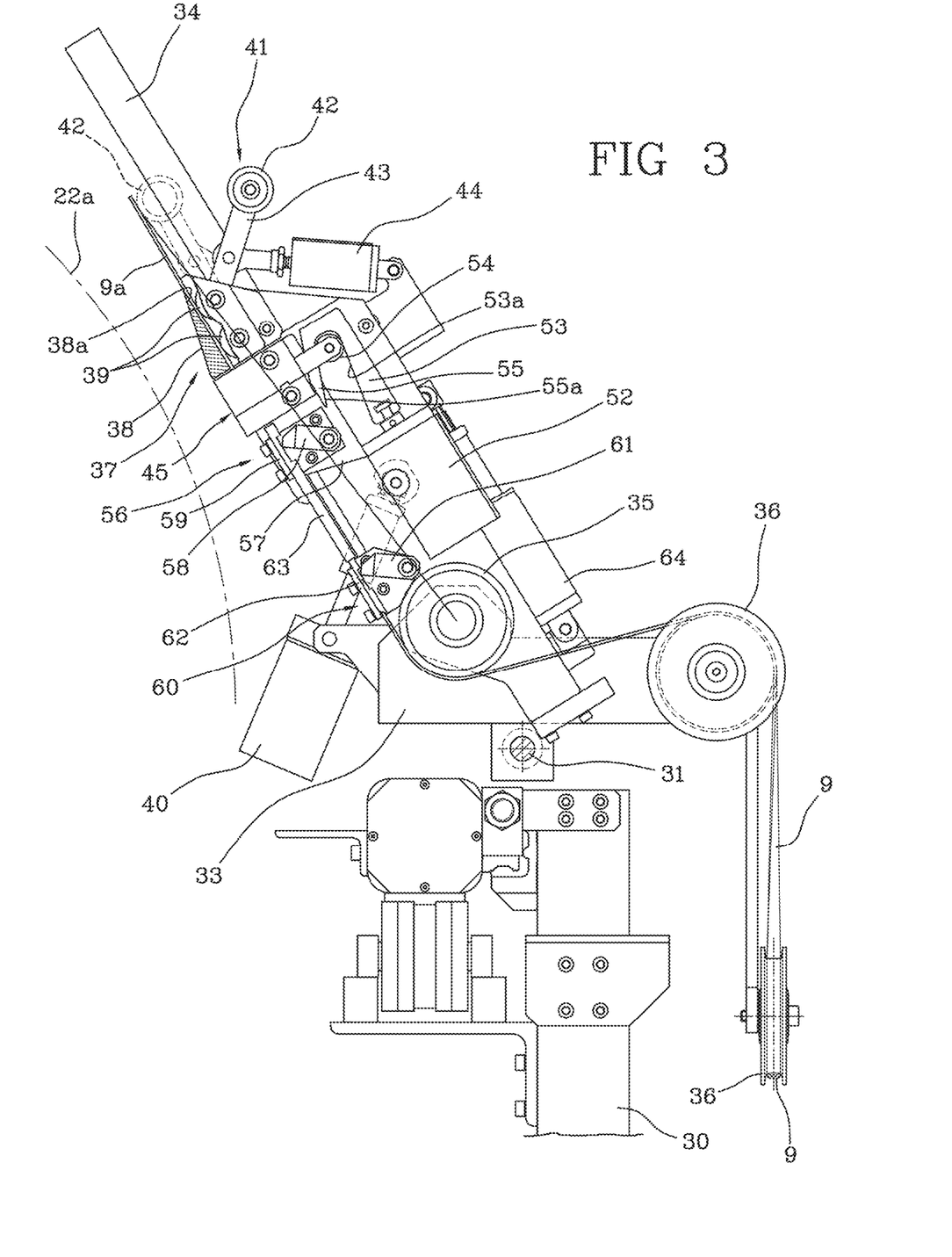
FIG. 3 is a side view of one of the carriages associated with the apparatus in FIG. 2.

Each carriage 29 carries guide devices 35, 37 suitable to engage a respective continuous elongated element 9 adapted to make the zero-degree layer 8 and coming from a reel or other suitable feed member not shown, to suitably guide it to the forming drum 22. In more detail, each carriage 29 has a base 33 to which an arm 34 extending; away from the base 33 itself is secured in an oscillating manner according to an axis parallel to the rotation axis X-X of the forming drum 22. In engagement with carriage 29 there is at least one entry transmission 35 such as a pulley disposed on a rotation axis coincident with the oscillation axis of arm 34. One or more auxiliary idler pulleys 36 can be associated with the base 33 to operate on the continuous elongated element 9 coming from the feeding members, on a length thereof upstream of said entry pulley 35.

It is to be pointed out that in the present description the terms "upstream" and "downstream" refer, when not otherwise stated, to a feed direction of the continuous elongated element 9 coming from the above mentioned feeding members.

An end snub guide 37 supported along arm 34 at a spaced position and downstream with respect to the entry pulley 35, co-operates with said entry pulley to slidable engage the continuous elongated element 9 in a longitudinal feed direction "L" directed to the forming drum 22. This longitudinal feed direction "L" is substantially coincident with an alignment direction tangent to the end guide and the entry pulley 35.

Figure 4:
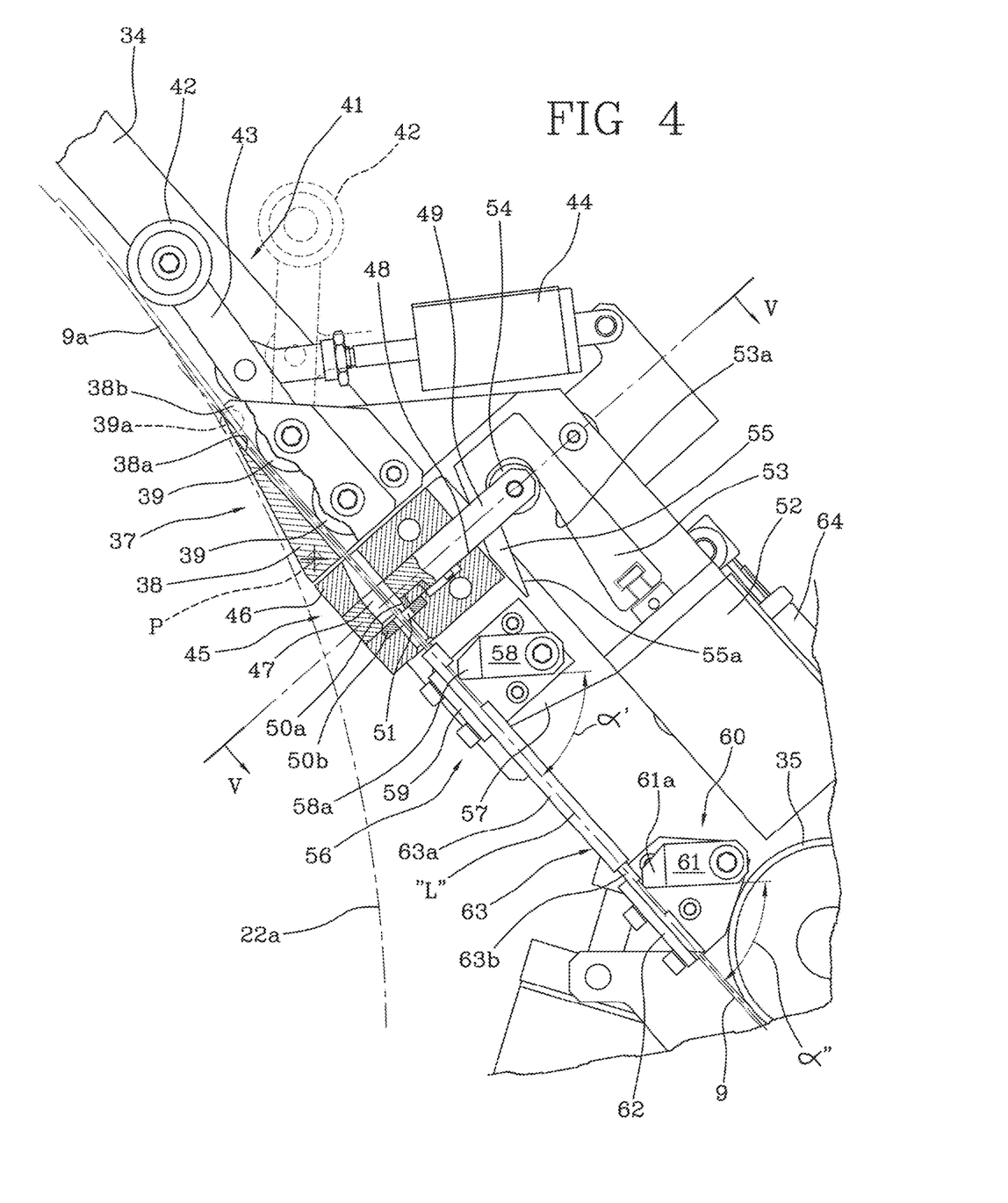
FIG. 4 shows a portion of FIG. 3 to an enlarged scale and partly in section.

In more detail, the end guide 37 comprises an end block 38 carrying a rest surface 38a arranged to support the continuous elongated element 9, in case of need. The rest surface 39a can be laterally confined by two containment walls 38b possibly adapted to act against the opposite side edges of the continuous elongated element 9 to hinder undesirable transverse movements of the latter with respect to the end block 38. At least one sliding roller 39 can be engaged with the end block 38, between the containment walls 38b for example or at a conveniently spaced position downstream of the rest surface 38a, the circumferential outer edge of said roller being adapted to abut and act against the continuous elongated element 9 when the latter carries out a longitudinal translation towards the forming drum 22, to be applied thereto. Advantageously, the perimetral edge of each sliding roller 39 is spaced from the rest surface 38a or the plane on which said surface lies, by an amount greater than the thickness of the continuous elongated element 9, so as to prevent the continuous elongated element 9 from sliding against the rest surface 38a during application.

A first fluid-operated actuator 40 is operatively interposed between the base 33 and the arm 34 of carriage 29 to move the latter between a rest position at which it is spaced apart from the forming drum 22, so that it does not interfere with a possible axial movement of the latter, and a work position at which it is located close to the drum itself, the end block 38 being disposed substantially flush with the laying surface 22a. Members for adjusting the end-of-stroke position at least in the work position can be associated with the first fluid-Operated actuator 40 so as to adapt the arm positioning in the work position to the outer diameter of the laying surface 22a of the forming drum 22.

To further improve the delivery accuracy, in a possible alternative embodiment the end block 38 can be elastically hinged with respect to arm 34 on a horizontal axis denoted, at P in FIG. 4, at its farthest end from the forming drum 22. The end block 38 carries at least one rest block 39a identified by a chain line in FIG. 4, which projects in cantilevered fashion from the block end opposite to the hinging axis P, to exert a thrust action against the forming drum 22. Hinging on axis P enables the end block 38 to rotate with the free end downwards so as to keep the rest roller 39a against the laying surface 22a. A suitable counter-spring operating on the end block 38 clamps the possibly present too sharp oscillations.

Also mounted on the arm 34 of carriage 29 are devices 41 for applying the continuous elongated element 9 against the laying surface 22a of the forming drum 22. These application devices 41 comprise at least one presser roller 42 for example, that is operatively carried by a support element 43 hinged with respect to the end block 38 or possibly the support 34 and oscillating, upon command of a second fluid-operated actuator 44, between a rest position at which it is spaced apart from the forming drum 22 and a work position at which said presser roller 42 operates in thrust relationship on the continuous elongated element 9 to urge it against the laying surface 22a.

For manufacturing the zero-degree layer 8 or similar reinforcing structure, each carriage 29 is set with the respective continuous elongated element 9 in engagement with the guide devices 35, 37 so that one free end thereof is in a grip position on the trajectory covered by the presser roller 42 when moving between the rest and work positions.

When positioning of the forming drum 22 in front of the apparatus 25 for manufacture of the reinforcing structure has been carried out, after application of the belt layers 7 thereto, the first fluid-operated actuator 40 of each carriage 29 brings the respective arm 34 to a work position on the laying surface 22a of the forming drum 22. Subsequently, the presser roller 42 associated with the arm 34 of each carriage 29 is brought from the respective rest position to the work position, upon command of the second actuator 44. In the work position, each presser roller 42 pushes the free end of the corresponding continuous elongated element 9 against the laying surface 22a of the forming drum 22.

The forming drum 22 is then driven in rotation around its axis, so that circumferential winding of the continuous elongated element 9 occurs.

Simultaneously, driving in rotation of the screw 31 causes carriages 29 to simultaneously move close to or away from each other, so as to give rise to winding of each continuous elongated element 9 into coils disposed axially in side by side relationship on the laying surface 22a to make the respective portion 8a of the zero-degree layer 8, according to a desired axial extension on the belt layers 7 carried by the forming drum 22.

During winding, threading of each continuous elongated element 9 occurs, due to the rotation imposed to the forming drum 22, and said elongated element moves along the respective arm 34 in the feed direction "L", in the absence of important sliding contacts with the different components of the apparatus. Referring particularly to the embodiment shown in the drawings, it will be recognised that in the work position, the circumferential outer edge of each sliding roller 39 appears to be slightly touched by an ideal line tangentially extending from the laying surface 22a and/or the presser roller 42 to the entry pulley 35, so as to ensure that the continuous elongated element 9 will rest on the roller itself in the absence of sliding contact with the rest surface 38a or the different components disposed close to the end block 38 and/or upstream of the latter.

The arm 34 of carriage 29 further carries at least one cutting unit 45 to be selectively switched on at the end of the above described winding step, to cut off the continuous elongated element 9 on a length thereof included between the pulley or other entry transmission 35 and the application devices 41. More specifically, the cutting unit 45 operates on the continuous elongated element 9 close to the end block 38, preferably at a point immediately upstream of said block.

The cutting unit 45 comprises a guide block 46 fastened to the aria 34 of carriage 29 and having a through channel 47 extending along the feed direction "L", so that it is longitudinally passed through by the continuous elongated element 9.

Further formed in the guide block 46 is a slide seat 48 opening into the through channel 47 in a direction substantially perpendicular thereto. Guided in the slide seat 48 is a punch 49 carrying a first cutting edge or movable cutting edge 50 at one end thereof. The movable cutting edge 50a co-operates with a second cutting edge or fixed cutting edge 50b, carried by the guide block 46, at a region where the slide seat 48 of punch 49 opens into the through channel 47.

The cutting edges 50a, 50b are movable relative to each other to cut off the continuous elongated element 9 starting from a rest position to a cutting position. In the rest position, or in any case before reaching the cutting position, the fixed 50b and/or movable 50a cutting edges advantageously define a passage clearance enclosing the continuous elongated element 9 at least partly; preferably the passage clearance 51 extends substantially in the form of a closed line around the continuous elongated element 9. More particularly, the passage clearance 51 is preferably defined by an opening of circular shape or other suitable outline formed in the fixed cutting edge 50b, in a continuity relationship with the through channel 47. Alternatively, the passage clearance 51 can be defined by two distinct portions, formed in the first and second cutting edges 50a, 50b, respectively.

The first cutting edge 50a is movable upon command of a linear actuator 52, to which, a thrust block 53 is rigidly connected, said thrust block 53 carrying an inclined plane 53a co-operating with a roller or other abutment element 54 carried by the punch 49 or connected to the first cutting edge 50a in a different manner. The action of the inclined plane enables amplification of the thrust transmitted to the first cutting edge 50a upon the action of the linear actuator 52. The thrust block 53 preferably has a return extension 55 having an auxiliary inclined plane 55a set to operate on the abutment roller 54 on the opposite side from said inclined plane 53a, to allow the first cutting edge 50a to return to a rest position, upon command of the linear actuator 52.

Advantageously, arrangement of the passage clearance 51 enclosing the continuous elongated element 9 at least partly, in particular in a closed line around the element itself, eliminates any possibility of side shifting of the elongated element between the cutting edges 50a, 50b, during mutual movement of the latter for carrying out a cutting action. Thus, a perfect cutting operation is ensured even when the continuous elongated element 9 is reinforced with steel cords or in any case cords made of a high-toughness material.

After the cutting operation has been completed, the continuous elongated element 9 is submitted to an advancing step along the guide devices 35, 37 to set the free end of said elongated element 9 downstream of the cutting unit 45, to the grip position suitable for engagement of the elongated element itself by the application devices 41. To this aim, operatively associated with each carriage 29 are feeding devices 56 comprising a slider 57 slidably guided relative to the arm 34 and movable in parallel to the longitudinal feed direction "L" of the continuous elongated element 9 in the length included between the entry transmission 35 and end guide 37.

The slider 57 preferably carrying the cutting unit 45 and the previously described application devices 41, is movable with a reciprocating motion upon command of a linear feed actuator 64 fastened to the arm 34 and further carries at least one threading element 58 operating on the continuous elongated element 9 upstream of the cutting unit 45, to urge the elongated element in a step by step movement towards the forming drum 22, i.e. away from the entry pulley 35, together with the cutting unit itself.

In more detail, the threading element 58 is hinged with respect to slider 57 and has one free end 58a acting against the continuous elongated element 9 at a contact point located on the opposite side from a first abutment plate 59 carried by the slider itself. The contact point and the oscillation axis of the threading element 58 are aligned in a direction that with the longitudinal feed direction "L" of the continuous elongated element 9, forms an acute angle "a" facing the cutting unit 45. In other words, the vertex formed of the acute angle "a" is directed towards the cutting unit 45, as shown in FIG. 4.

As a result of this solution, the free end 58a of the threading element 58 tends to be wedged against the continuous elongated element 9 during the step of pushing the same towards the grip position and/or the forming drum 22, together with the cutting unit 45 and the application devices 41. Thus there is a guarantee that the continuous elongated element 9 will be translated over the whole stroke carried out by the slider 57 in the absence of sliding actions and in the absence of loads also along the length included between the free end of the elongated element itself and the threading element 58. Adjusting members can be associated with the linear feed actuator 64 to adapt the length of the stroke to the displacement amount to be imparted to the continuous elongated element 9 to set it to the grip position. The grip position can be reached by a single operation of the linear feed actuator 54 (FIG. 6) or by a step by step moving forward following repeated driving actions of the actuator itself.

Figure 7:
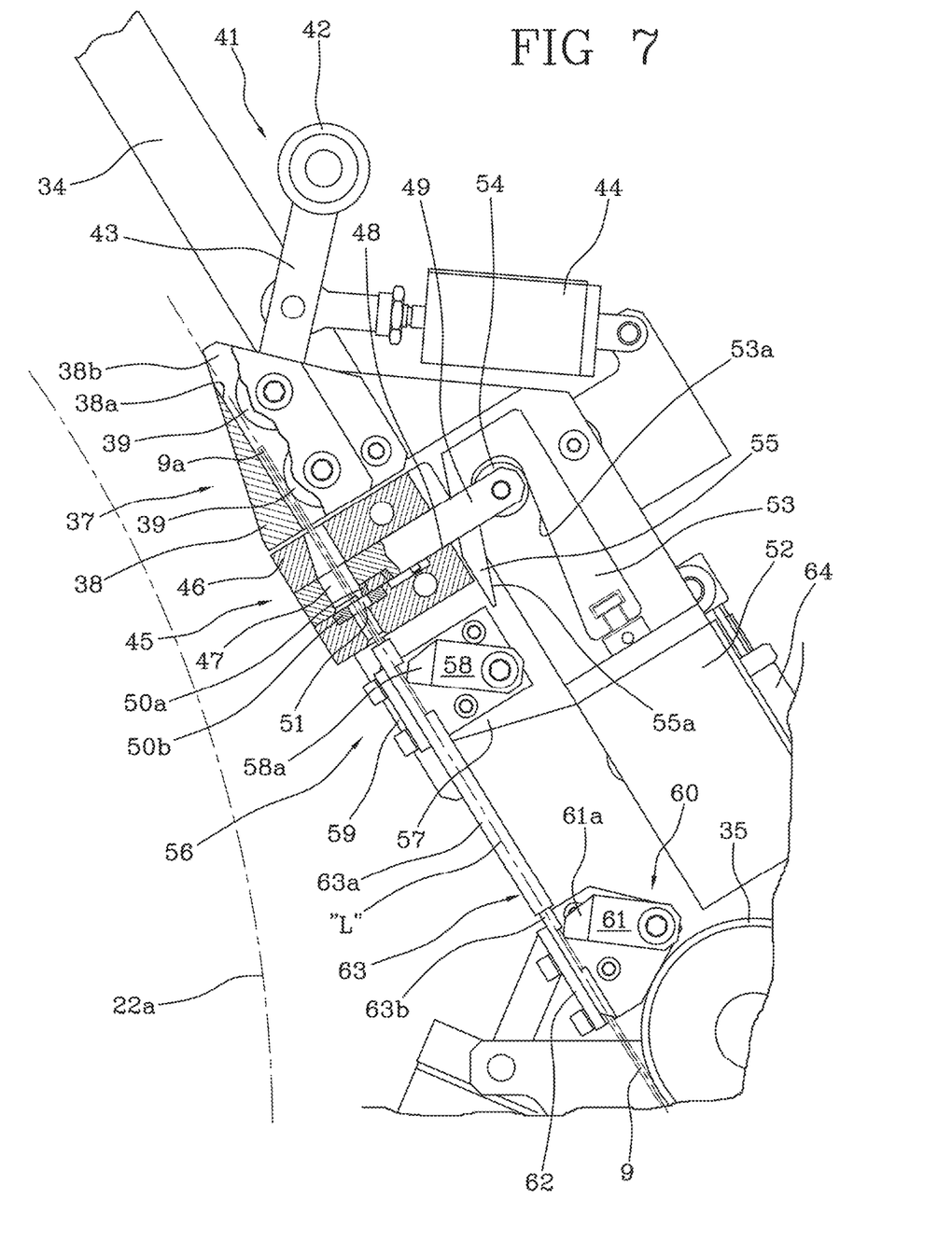
FIG. 7 shows a return step of the feeding devices, after the continuous elongated element has reached the grip position.

When the linear feed actuator 64 brings the slider 57 back to the starting position, away from the forming drum 22, i.e. towards the entry pulley 35, the threading element 58 freely slides on the continuous elongated element 9 without inducing important backward threading actions on the same (FIG. 7). It is however provided that any sliding of the continuous elongated element 9 away from the cutting unit 45 be efficiently inhibited by return-preventing devices 60 operating on the continuous elongated element itself upstream of the cutting unit 45. To this atm, the return-preventing devices 60 comprise at least one auxiliary grip element 61 oscillatably supported by the arm 34 and having one free end 61a acting against the continuous elongated element 9 on the opposite side from a second abutment plate 62 fixed with respect to the arm 34 itself. The contact point of the end of the auxiliary grip element 61, located upstream of the threading element 58 is in alignment with the oscillation axis of the grip element itself in a direction that with the longitudinal feed direction "L" of the continuous elongated element 9, forms an acute angle "a" facing the cutting unit 45. The auxiliary grip element 61 supported on a fixed oscillation axis with respect to the arm 34, is adapted to be wedged against the surface of the continuous elongated element 9 so as to prevent moving backwards of same during the return stroke of slider 37 to the entry pulley 35. Vice versa, in the steps of pushing the continuous elongated element 9 towards the cutting unit 45, the auxiliary grip element 61 allows easy sliding of the continuous elongated element.

Any side deflection of the continuous elongated element 9 in the length upstream of the cutting unit 45 is efficiently prevented by guiding the elongated element itself along at least one guide duct 63 operating in a length included between the feeding devices 56 and the cutting unit 45. In particular, the guide duct 63 comprises a movable section 63a fixed with respect to slider 57 and a fixed section 63b, integral with respect to arm 34 and preferably fastened to the second abutment plate 62. The movable section 63a and fixed section 63b are telescopically slidable with respect to each other and longitudinally passed through by the continuous elongated element 9.

The guide duct 63 therefore exerts an efficient annular containment action on the continuous elongated element 9 so that undesirable side deflections of the latter during the action of the feeding means are prevented.

The invention claimed is:

1. An apparatus for making reinforcing structures for tyres, comprising:
  a forming drum drivable in rotation;
  guide devices to guide a continuous elongated element comprising at least one reinforcing cord, along a longitudinal feed direction toward the forming drum;
  application devices for application of the continuous elongated element against a laying surface externally carried by the forming drum;
  at least one cutting unit for cutting the continuous elongated element on a length thereof upstream of the application devices; and
  feeding devices operating on the continuous elongated element to arrange one free end of the continuous elongated element to a grip position downstream of the cutting unit,
    wherein the feeding devices comprise a slider movable with a reciprocating motion in a longitudinal feed direction of the continuous elongated element, and at least one threading element carried by the slider and having one free end acting against the continuous elongated element at a first contact point to block the continuous elongated element with respect to the slider when the slider moves toward the forming drum, and
    wherein the cutting unit is operatively mounted on said slider;
    wherein the cutting unit comprises a first cutting edge and a second cutting edge that are mutually movable to a cutting position and before reaching the cutting position, define a passage clearance enclosing the continuous elongated element at least partly.

2. The apparatus as claimed in claim 1, wherein the passage clearance is defined by an opening formed in the second cutting edge.

3. The apparatus as claimed in claim 1, wherein the first cutting edge is movable upon command of a linear actuator operating on the first cutting edge through an inclined plane.

4. The apparatus as claimed in claim 1, wherein said guide devices, application devices and cutting unit are carried by a carriage that is movable in parallel to a geometric axis of the forming drum to distribute the continuous elongated element into coils disposed mutually in side by side relationship on the laying surface of the forming drum driven in rotation.

5. The apparatus as claimed in claim 4, comprising at least two of said carriages carrying respective guide devices, application devices and cutting units, said carriages being symmetrically movable with respect to an equatorial plane of the forming drum to simultaneously form two portions of said reinforcing structure disposed symmetric to the equatorial plane.

6. The apparatus as claimed in claim 4, wherein the application devices comprise at least one presser roller operatively carried by an arm oscillating between a rest position at which the presser roller is spaced apart from the forming drum and a work position at which the presser roller operates in thrust relationship on the continuous elongated element to urge it against the laying surface of the forming drum.

7. A plant for manufacturing tyres, comprising:
  devices to make a carcass structure;
    devices to make a belt structure; and
    devices to apply the belt structure to the carcass structure at a radially external position thereof,
      wherein the devices to make the belt structure comprise at least one apparatus for forming a reinforcing structure according to claim 1.

8. An apparatus for making reinforcing structures for tyres, comprising:
  a forming drum drivable in rotation;
  guide devices to guide a continuous elongated element comprising at least one reinforcing cord, along a longitudinal feed direction toward the forming drum;
  application devices for application of the continuous elongated element against a laying surface externally carried by the forming drum;
  at least one cutting unit for cutting the continuous elongated element on a length thereof upstream of the application devices; and
  feeding devices operating on the continuous elongated element to arrange one free end of the continuous elongated element to a grip position downstream of the cutting unit,
    wherein the feeding devices comprise a slider movable with a reciprocating motion in a longitudinal feed direction of the continuous elongated element, and at least one threading element carried by the slider and having one free end acting against the continuous elongated element at a first contact point to block the continuous elongated element with respect to the slider when the slider moves toward the forming drum, and
    wherein said threading element slides against the continuous elongated element during movement of the slider away from the forming drum.

9. The apparatus as claimed in claim 8, further comprising at least one guide duct longitudinally passed through by the continuous elongated element to hinder slide deflections of the continuous elongated element on a length thereof upstream of the cutting unit.

10. The apparatus as claimed in claim 9, further comprising return-preventing devices operating on the continuous elongated element upstream of the cutting unit to hinder sliding movements of the continuous elongated element away from the cutting unit.

11. The apparatus as claimed in claim 8, wherein the threading element is hinged to the slider on an oscillation axis of the threading element.

12. The apparatus as claimed in claim 11, wherein said first contact point and the oscillation axis of the threading element are aligned in a direction that forms an acute angle with the longitudinal feed direction of the continuous elongated element, wherein a vertex of the acute angle is directed towards the cutting unit.

13. An apparatus for making reinforcing structures for tyres, comprising:
  a forming drum drivable in rotation;
  guide devices to guide a continuous elongated element comprising at least one reinforcing cord, along a longitudinal feed direction toward the forming drum;
  application devices for application of the continuous elongated element against a laying surface externally carried by the forming drum;
  at least one cutting unit for cutting the continuous elongated element on a length thereof upstream of the application devices;
  feeding devices operating on the continuous elongated element to arrange one free end of the continuous elongated element to a grip position downstream of the cutting unit,
    wherein the feeding devices comprise a slider movable with a reciprocating motion in a longitudinal feed direction of the continuous elongated element, and at least one threading element carried by the slider and having one free end acting against the continuous elongated element at a first contact point to block the continuous elongated element with respect to the slider when the slider moves toward the forming drum, and
    wherein said threading element slides with respect to the continuous elongated element during movement of the slider away from the forming drum;
  further comprising at least one guide duct longitudinally passed through by the continuous elongated element to hinder slide deflections of the continuous elongated element on a length thereof upstream of the cutting unit; and
  further comprising return-preventing devices operating on the continuous elongated element upstream of the cutting unit to hinder sliding movements of the continuous elongated element away from the cutting unit,
    wherein said return-preventing devices comprise at least one auxiliary grip element having one free end acting against the continuous elongated element at a second contact point located upstream of the threading element and aligned with an oscillation axis of the auxiliary grip element, in a direction that forms an acute angle with the longitudinal feed direction of the continuous elongated element, the acute angle facing the cutting unit.

14. The apparatus as claimed in claim 13, wherein the auxiliary grip element is oscillatably supported on a fixed oscillation axis by an arm of a carriage carrying said guide devices, application devices and cutting unit.

15. The apparatus as claimed in claim 14, wherein said auxiliary grip element has one respective free end acting against the continuous elongated element on an opposite side with respect to a second abutment plate fixed with respect to said arm.

16. The apparatus as claimed in claim 15, wherein said first contact point is located on the continuous elongated element on an opposite side with respect to a first abutment plate carried by the slider.

17. The apparatus as claimed in claim 14, wherein the guide duct comprises a movable section fixed with respect to the slider, and a fixed section integral with respect to said arm.

18. The apparatus as claimed in claim 17, wherein said movable section and fixed section are telescopically slidable with respect to each other and longitudinally passed through by the continuous elongated element.

19. The apparatus as claimed in claim 18, wherein the fixed section is integral with the cutting unit.

20. An apparatus for making reinforcing structures for tyres, comprising:
  a forming drum drivable in rotation;
  guide devices to guide a continuous elongated element comprising at least one reinforcing cord, along a longitudinal feed direction toward the forming drum;
  application devices for application of the continuous elongated element against a laying surface externally carried by the forming drum;
  at least one cutting unit for cutting the continuous elongated element on a length thereof upstream of the application devices; and
  feeding devices operating on the continuous elongated element to arrange one free end of the continuous elongated element to a grip position downstream of the cutting unit,
    wherein the feeding devices comprise a slider movable with a reciprocating motion in a longitudinal feed direction of the continuous elongated element, and at least one threading element carried by the slider and having one free end acting against the continuous elongated element at a first contact point to block the continuous elongated element with respect to the slider when the slider moves toward the forming drum,
    wherein the cutting unit comprises a first cutting edge and a second cutting edge that are mutually movable to a cutting position and before reaching the cutting position, define a passage clearance enclosing the continuous elongated element at least partly,
    wherein the first cutting edge is movable upon command of a linear actuator operating on the first cutting edge through an inclined plane, and
    wherein the inclined plane is carried by a thrust block connected to the linear actuator and co-operating with an abutment connected to the first cutting edge of the cutting unit.

21. The apparatus as claimed in claim 20, wherein the thrust block has a return extension carrying an auxiliary inclined plane operating on the abutment on an opposite side with respect to said inclined plane, to bring the first cutting edge back to a rest position.

22. A method of manufacturing tyres, comprising the steps of:
  making a carcass structure;
  making a belt structure; and
  applying the belt structure to the carcass structure at a radially external position thereof,
    wherein the step of making the belt structure comprises formation of at least one reinforcing structure through winding on the forming drum of at least one continuous elongated element comprising at least one reinforcing cord, to form circumferential coils disposed consecutively in side by side relationship, wherein winding comprises the following steps:
- guiding the continuous elongated element toward the forming drum drivable in rotation;
- applying the continuous elongated element against a laying surface externally carried by the forming drum;
- cutting the continuous elongated element upon the action of a cutting unit; and
- setting one free end of the continuous elongated element to a grip position downstream of the cutting unit, wherein the step of setting one free end of the continuous elongated element to a grip position comprises the steps of driving a slider movable with a reciprocating motion in a longitudinal feed direction of the continuous elongated element and blocking the continuous elongated element with respect to the slider when the latter moves toward the forming drum, and wherein the cutting unit is operatively mounted on the slider.

\* \* \* \* \*